(12) United States Patent
Berkouk et al.

(10) Patent No.: US 10,298,088 B2
(45) Date of Patent: May 21, 2019

(54) ROTARY ELECTRIC MACHINE

(71) Applicant: Brose Fahrzeugteile GmbH & Co. KG, Wuerzburg, Wuerzburg (DE)

(72) Inventors: Maurad Berkouk, Le Conquet (FR); Sebastien Labat, Schwanfeld (DE); Eric Fournier, Etival les le Mans (FR)

(73) Assignee: Brose Fahrzeugteile GmbH & Co. KG, Wuerzburg, Wuerzburg (DE)

( * ) Notice: Subject to any disclaimer, the term of this patent is extended or adjusted under 35 U.S.C. 154(b) by 732 days.

(21) Appl. No.: 14/809,700

(22) Filed: Jul. 27, 2015

(65) Prior Publication Data
US 2015/0333595 A1 Nov. 19, 2015

Related U.S. Application Data

(63) Continuation of application No. PCT/EP2014/000189, filed on Jan. 24, 2014.

(30) Foreign Application Priority Data

Jan. 24, 2014 (DE) .................. 10 2013 001 314

(51) Int. Cl.
*H02K 11/00* (2016.01)
*H02K 5/22* (2006.01)
(Continued)

(52) U.S. Cl.
CPC ............. *H02K 5/225* (2013.01); *H01R 13/02* (2013.01); *H02K 11/01* (2016.01); *H02K 11/022* (2013.01); *H02K 11/33* (2016.01); *H02K 11/40* (2016.01)

(58) Field of Classification Search
CPC .......... H02K 5/20; H02K 5/225; H02K 11/33; H02K 15/02; H02K 3/522; H02K 5/22;
(Continued)

(56) References Cited

U.S. PATENT DOCUMENTS 4,172,230 A 10/1979 Benezech
4,642,885 A 2/1987 King
(Continued)

FOREIGN PATENT DOCUMENTS

CN 1384905 A 12/2002
CN 200973041 Y 11/2007
(Continued)

OTHER PUBLICATIONS

EP 2387053 A1 machine translation Dec. 26, 2017.*
(Continued)

*Primary Examiner* — Thomas Truong
*Assistant Examiner* — Leda Pham
(74) *Attorney, Agent, or Firm* — Muncy, Geissler, Olds & Lowe, P.C.

(57) ABSTRACT

A rotary electric machine having a stator and a rotor, in addition to an electric control device and a connection device which comprises at least one coupling element for electrically connecting the control device to one or several electrical lines and a mass element provided to connect to an electric mass potential. In order to improve the machine with respect to electromagnetic interference, the stator is connected to the mass element by a contact bridge which has a first securing section and a second securing section in addition to a bridge element arranged between the securing sections and includes a single-piece spring steel sheet which is at least partially sinuous.

10 Claims, 15 Drawing Sheets

(51) Int. Cl.
*H01R 13/02* (2006.01)
*H02K 11/22* (2016.01)
*H02K 11/01* (2016.01)
*H02K 11/33* (2016.01)
*H02K 11/40* (2016.01)

(58) Field of Classification Search
CPC .......... H02K 11/00; H02K 5/08; H02K 15/00;
H02K 3/50; H02K 3/52; Y10T 29/49012;
Y10T 29/49009; H05K 1/02; H05K 7/00;
H05K 3/325; H05K 1/18; H05K 1/0213;
H01R 13/02; H01R 12/00; H01R 12/16;
H01R 13/514; H01R 13/648
USPC .......................................................... 310/71
See application file for complete search history.

(56) References Cited

U.S. PATENT DOCUMENTS

| | | | |
|---|---|---|---|
| 5,969,445 A | 10/1999 | Horiuchi et al. | |
| 7,247,007 B2 | 7/2007 | Roke et al. | |
| 8,157,597 B2* | 4/2012 | Chang | H01R 12/55 |
| | | | 439/660 |
| 8,378,538 B2 | 2/2013 | Silva | |
| 8,674,569 B2* | 3/2014 | Jang | H02K 3/522 |
| | | | 310/194 |
| 2002/0053843 A1* | 5/2002 | Sunaga | H02K 3/50 |
| | | | 310/68 R |
| 2003/0008562 A1* | 1/2003 | Yamasaki | H01R 23/688 |
| | | | 439/607.11 |
| 2006/0175917 A1 | 8/2006 | Nanbu et al. | |
| 2012/0091839 A1* | 4/2012 | Hein | H02K 5/225 |
| | | | 310/71 |
| 2013/0270942 A1 | 10/2013 | Riehl et al. | |

FOREIGN PATENT DOCUMENTS

| | | | |
|---|---|---|---|
| CN | 101247062 A | 8/2008 | |
| CN | 101675573 A | 3/2010 | |
| CN | 102280308 A | 12/2011 | |
| DE | 28 14 782 A1 | 2/1979 | |
| EP | 2 387 053 A1 | 11/2011 | |
| EP | 2387053 A1 * | 11/2011 | ............... H01H 1/26 |
| WO | WO 01/37400 A2 | 5/2004 | |
| WO | WO 2010/108709 A1 | 9/2010 | |
| WO | WO 2010108709 A1 * | 9/2010 | ............. H02K 5/225 |
| WO | WO 2012/089406 A2 | 7/2012 | |

OTHER PUBLICATIONS

EP 2387053 A1 machine translation Oct. 28, 2018.*
Chinese Office Action for Chinese Application No. 201480005881.4 dated Jan. 13, 2017—English translation.

* cited by examiner

ROTARY ELECTRIC MACHINE

This nonprovisional application is a continuation of International Application No. PCT/EP2014/000189, which was filed on Jan. 24, 2014, and which claims priority to German Patent Application No. 10 2013 001 314.3, which was filed in Germany on Jan. 26, 2013, and which are both herein incorporated by reference.

BACKGROUND OF THE INVENTION

Field of the Invention

The invention relates to the field of electrotechnology and can be used in rotary electric machines, particularly electric motors and generators.

Description of the Background Art

In more recent times rotary electric machines, particularly electric motors, but generators as well, are often designed as so-called brushless machines, whereby accordingly direct electric contacting of a rotor by brushes is not necessary. The rotor can be equipped with permanent magnets, which are driven in a rotating magnetic field of the stator. The stator has stator windings for this purpose, which are controlled accordingly to generate a rotating magnetic field. Control methods are often used in this case, for example, via pulse width modulation (PWM), whereby the stator winding can be realized typically by semiconductor circuits with metal-oxide-semiconductor field-effect transistors (MOSFETs), IGBTs, or thyristors. Largely freely selectable field configurations and accordingly also dynamically rotating fields can be created via pulse width modulation.

Because electrical step signals that are to simulate, for example, a sinusoidal control characteristic as accurately as possible are produced particularly during the use of pulse width modulation in the kHz to MHz range, the emission of electromagnetic waves in the area of the windings and lines must be expected.

This electromagnetic effect can act on the control circuit, for example, but also on other units and consumers in the vicinity of the rotary electric machine, which is generally undesirable. For this reason, emphasis continues to be placed on the demand for increased electromagnetic compatibility or as low a transmitting activity as possible. Accordingly, interference in electric machines should be largely eliminated.

SUMMARY OF THE INVENTION

In it therefor an object of the present invention to minimize the generation of interfering electromagnetic emission signals by effective connection of parts of an electric machine to a ground potential. In so doing, the ground connection is to be made as simple, reliable, and assembly-friendly as possible.

In an embodiment, the invention relates to a highly electrically conductive ground connection that is as short as possible in order to prevent compensating and annular currents, and also to attenuate as much as possible possibly arising voltage spikes due to sparkovers and/or to take them to a ground potential.

It is provided in an embodiment, in a rotary electric machine, particularly an electric motor, comprising a stator and a rotor, as well as an electronic control device and a connector, which has at least one coupling element for electrically connecting the control device to one or more electrical lines and a ground element for connecting to an electrical ground potential, that the stator of the electric machine is connected to the ground element via a contact bridge, which comprises a first securing section and a second securing section, as well as a bridge element arranged between the sections and comprising a single-piece spring sheet which is made at least partially meander-shaped.

In the exemplary embodiments, the stator of a rotary electric machine can have an iron core, for example, made of laminated iron sheets or of some other highly permeable material, which is surrounded by the windings of a stator winding. The stator winding can be supplied with a current and a voltage and is electrically insulated from the other parts of the stator.

To assure a high degree of electromagnetic compatibility, it is expedient to connect as many stator parts as possible to a ground potential reliably and via a lowest possible electrical resistance. The contact bridge of the invention can serve as the connecting element; it can be connected electrically, for example, to an end shield of an electric motor, on the one hand, and to a printed circuit board of a control device or a metal shield plate, on the other. Securing sections are used for the mechanical securing of the contact bridge, whereby these can certainly also be used in addition for electrical contacting.

If a spring sheet is used in the bridge element of the contact bridge, there is the possibility of bending the sheet in a simple way at least in the direction perpendicular to the plane of the spring sheet. A spring sheet is used advantageously, so that an elastic bending is possible. In order to achieve flexibility within the plane of the spring sheet as well, the metal sheet is designed meander-shaped, which to a certain extent also permits bending or curving of the spring sheet in the plane of the sheet. Overall, the meander-shaped sheet thus represents a conductor that is flexibly movable in all directions.

The bridge element/spring sheet can be connected as a single piece to the securing sections, so that these merely represent the end regions of the spring sheet and are electrically connected in an optimal way to the meander-shaped part of the contact bridge. Nevertheless, with a suitable configuration, for example, as square or rectangular sheet metal parts, the securing sections can have the necessary stability for securing.

An exemplary embodiment of the invention provides that the spring sheet can have a plurality of adjoining curved sections with a changing curvature direction in each case.

The described geometric form corresponds to a meandering shape with curved boundary lines. A meandering shape with straight sheet metal sections running perpendicular to one another is also conceivable, for example.

A further embodiment of the invention provides that the bridge element has S-shaped elements and/or mirrored S-shaped elements.

A further embodiment of the invention provides that the bridge element can extend substantially as a planar spring sheet in a first surface along a longitudinal direction, which is defined by the connecting line between the first and second securing section. Sections of the spring sheet, which run substantially in the longitudinal direction or parallel to the longitudinal direction, are in this case angled by 90° out of the first surface relative to the other sections of the spring sheet.

In this case, the bending edges can run advantageously parallel to the longitudinal direction. The spring sheet regions angled by 90° increase the flexibility in bendings within or parallel to the first surface of the spring sheet.

The invention in addition can be designed in that the first and/or second securing section can have a continuous clamp opening, particularly also a continuous clamping slot. A clamping pin can be clamped suitably in the clamp opening. For this reason, the contact bridge can be secured especially easily within the electric machine to the suitably provided clamping pins.

To improve the securing of the contact bridge, it can be advantageously provided further that at least one securing section can have at least one separation slot, open toward the continuous clamping opening, such that at least one edge region of the clamping opening can be bent out perpendicular to the plane of the particular securing section due to the separation slot/plurality of separation slots. This assures that a clamping pin can be clamped in the particular clamping opening with a certain excess, whereby the edges of the clamping opening can deform elastically and a frictional, particularly self-locking connection between the particular clamping opening and the clamping pin is formed.

Further, the invention can be embodied advantageously in that the continuous clamping opening is a straight clamping slot, in that at both ends of the clamping slot in each case a separation slot is provided that is connected to the clamping slot and in particular runs transverse to it, and in that in each case at least one bendable edge strip is formed between the separation slots.

Edge strips formed in such a way between two separation slots are especially easily bendable outwardly, so that clamping pins can also be taken up in the clamping openings with a greater excess and tolerances can be easily compensated. A frictional locking of the particular clamping pin in the clamping opening occurs with a suitable design of the edge strips. Clamping pins can be made narrower at their free end for better insertion in the particular clamping opening, i.e., be formed pointed, particularly tapering conically, in order to make the securing process/assembly process easier.

It can be provided advantageously, moreover, that the contact bridge has a resilient contact arm to form an electrical pressure contact with a counter contact. For example, a first securing section can be used for the mechanical securing and electrical contacting of the contact bridge at one of its ends, whereas the second securing section is used solely for the mechanical securing and the contact at the second end of the contact bridge is created by the resilient contact arm, which is connected, for example, to a securing section. It is also conceivable, however, that both securing sections create both mechanical connections and electrical connections and that the resilient contact arm is used to create an additional pressure contact connection.

The resilient contact arm can represent, for example, a continuation of the spring sheet of the bridge element beyond one of the securing sections. Advantageously, the resilient contact arm can have a tapering contact tip, for example, at its free end in order to facilitate a pressure contact on a counter contact through an insulation layer as well.

It can be provided that the resilient contact arm can abut against a counter contact on a circuit board of the control device and/or against a metal plate placed between the control device and the stator. A securing section of the contact bridge can then be connected mechanically and electrically, for example, to an end shield and thus create the ground contact between the end shield and other parts of the stator, on the one hand, and a ground contact of a printed circuit board of the control device or the conductive shield plate, on the other.

Advantageously, at least parts of the motor stator and rotor are at ground potential. Expediently, the rotary electric machine can be brushless. In other words, the stator is not electrically contacted by the rotor by brushes or the like. Electromagnetic interference can be reduced further in this way. In particular, the electrical contact between the rotor and the stator does not occur via brushes, when the stator and rotor are at least partially at ground potential. Consequently, the contacting necessary for this occurs via the bearing between the rotor and stator.

Apart from a rotary electric machine of the above-described type, the invention also relates to a contact bridge comprising a first and second securing section and a meander-shaped spring sheet, arranged between the sections, to create an electrically conductive connection. The contact bridge in itself can optionally possess one or more of the features described above in regard to use in the electric machine.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
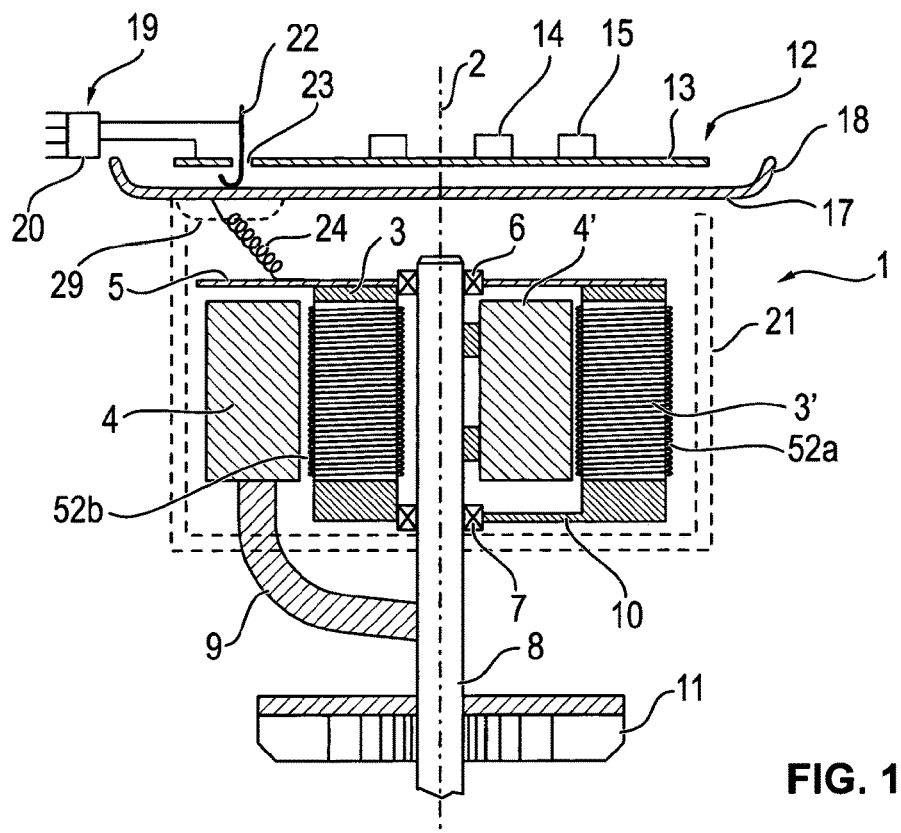
FIG. 1 shows a longitudinal section through a schematically illustrated electric motor, shown on the left side of the illustration with an outer rotor and on the right side of the illustration with an inner rotor.

FIG. 1 shows an electric machine in an overview in a longitudinal section in the example of a brushless electric motor 1.

Different configurations are illustrated on the left and right side of middle line 2. A brushless electric motor with an inner stator 3 and an outer rotor 4 is illustrated in a half-section on the left side. The inner stator is connected to a face-side end shield 5. A shaft 8 is mounted rotatably opposite to the end shield via a first bearing 6 and a second bearing 7 each of which can be formed identically in the left and right half-section.

In the machine shown in the left half-section, outer rotor 4 is connected via webs or a bell-shaped structure 9 to shaft 8 and supported by it. Moreover, outer rotor 4 can be mounted on end shield 5 via a ball bearing (not shown).

An electric motor with an inner rotor is shown on the right side of the section in FIG. 1, so that rotor 4' is located radially inside stator 3'. Stator 3' is fixedly connected to end shield 5 as well as, for example, to a further end shield 10.

Stator 3, 3' is provided in each case with a winding 52a, 52b, which surrounds one or more cores and is connected via control lines to a control device 12 in a manner not shown in greater detail.

Shaft 8 is mounted rotatably on end shields 5, 10 via bearings 6, 7. Inner rotor 4' is fixedly connected in addition to shaft 8.

Both designs are known in technology per se and both are shown here only for the sake of completeness, because the invention can be used in the case of both embodiments.

In the extension of shaft 8 downward, vane 11 of a fan/ventilator is indicated as a functional element to be driven by the shaft.

In FIG. 1 control device 12, which has a circuit board 13 and electronic components 14, 15 placed thereon, is shown above the stator and rotor. A shield plate 17, which consists at least partially of metal or is metallized and has edge 18 flanged upwards toward the circuit board, is placed between control device 12, more precisely circuit board 13, and end shield 5 of the motor. Shield plate 17, moreover, can serve as a heat sink for control device 12 and can be fixedly connected to circuit board 13.

Control device 12 is connected to a connector 19, which inter alia has a coupling element for the electrical connection to lines in the form of a part of plug-in connector 20. In addition, the housing of plug-in connector 20 in the shown example is connected to the ground potential and can form a ground element.

The formation and effect of an electrical shielding of the motor are shown, moreover, in FIG. 1 by the dashed double contour 21. Double contour 21 forms a bell-shaped cover, which is closed on its open side additionally by shield plate 17, so that the electromagnetically radiating parts of the stator and rotor outwardly emit no or as little electromagnetic radiation as possible.

In addition, in particular control device 12 as well is also shielded especially well from the motor winding by shield plate 17.

Double contour 21 can be formed, for example, as an complete contour by the grounded parts of the motor stator and rotor but it can also consist of an additional metallized part, which surrounds the aforementioned parts of the motor. In this regard, this can also be an engine housing, for example.

Basically, double contour 21 need not necessarily designate a specific part, however, but can symbolize only the electromagnetic shielding function assured by the present invention.

According to the present invention, different measures are provided for connecting the parts, provided for this purpose, of the motor stator and rotor and shield plate 17 effectively to the ground potential.

On the one hand, shield plate 17 is to be connected to a ground element, at ground potential, of the connector with the lowest possible electrical resistance and by the shortest possible route. To this end, a sheet metal tongue 22 is provided which is indicated only schematically in FIG. 1 and which is connected to the connector by a short path and for its part creates an electrical pressure contact with shield plate 17. Sheet metal tongue 22 thereby passes through the plane of circuit board 13. Circuit board 13 has a continuous opening 23 for this purpose.

The guiding of the sheet metal tongue is illustrated in detail more specifically below with use of exemplary embodiments.

The most reliable and shortest connection possible of end shield 5 to shield plate 17 is provided in order to realize the shielding function of the parts at ground potential of the motor stator and rotor. This connection has a contact bridge 24, which, on the one hand, is contacted reliably and effectively in an electrically conductive manner to shield plate 17 on one side and end shield 5 on the other and which, on the other hand, has a sufficient flexibility to compensate for fabrication tolerances during the assembly of the motor, on the one hand, and movements during operation between shield plate 17 or control device 12 and the motor stator and rotor, on the other.

The design of contact bridge 24 is also explained more precisely below with use of specific exemplary embodiments.

Figure 2:
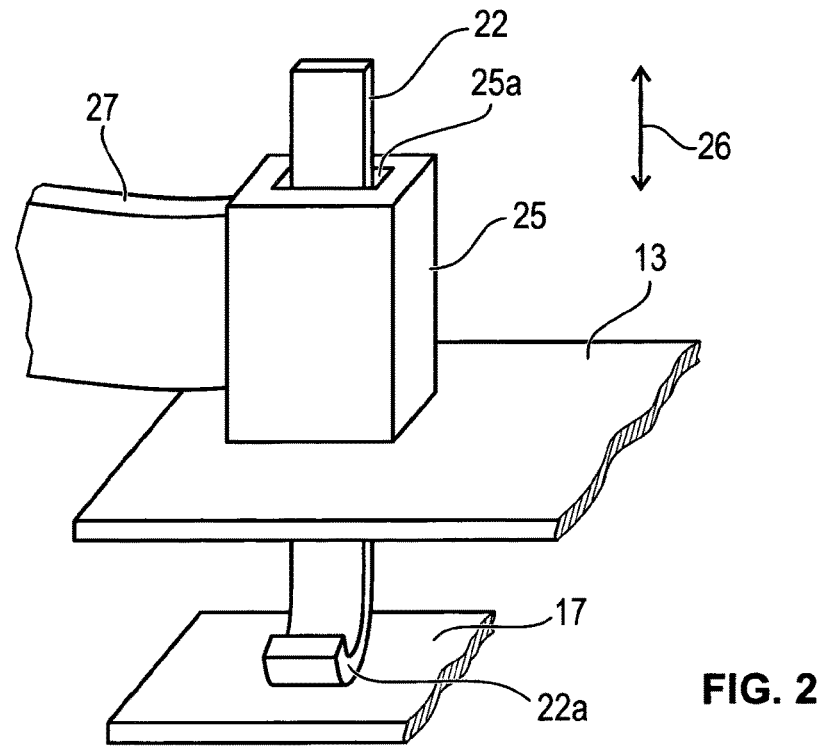
FIG. 2 shows a sheet metal tongue with a guide rail for connecting a shield plate to a ground element.

FIG. 2 in a three-dimensional view shows circuit board 13 and sheet metal tongue 22 passing through it, which below circuit board 13 contacts shield plate 17 via a pressure contact. Circuit board 13 and shield plate 17 are only shown partially here.

Sheet metal tongue 22 is shown as a flat, elastically flexible sheet metal body, which on its end facing shield plate 17 has an arched pressure contact part 22a. This is elastically deformable, so that via pressure contact part 22a due to the compensation of tolerances a permanent and secure pressure contact to the shield plate 17 can be produced with an elastic pressing force by the elastic deformation of the sheet metal tongue.

Sheet metal tongue 22 is advantageously held mechanically in a clamping device 25, on the one hand, and electrically contacted, on the other. Clamping device 25 for this reason advantageously consists at least partially of a highly conductive metal.

The sheet metal tongue is held within clamping device 25 either frictionally, i.e., by friction, or via a catch and fixed particularly in the direction perpendicular to the surface of circuit board 13, as indicated by double arrow 26.

Clamping device 25 is connected via a connecting tab 27 to a ground element of connector 19. For example, the contact tab can be made as a rigid metal sheet, which is connected to clamping device 25 integrally or by a glued, soldered, or welded joint and is rigidly connected in a manner, not shown in greater detail in FIG. 2, to the housing at ground potential of coupling element 20, i.e., for example, a female connector.

Clamping device 25 can be fixed to the circuit board, but it can also be movable relative to it and not be connected to it and held solely by contact tab 27.

In guide channel 25a which is formed in clamping device 25 for sheet metal tongue 22 and represents a guide rail for sheet metal tongue 22, the sheet metal tongue can be clamped frictionally by an attached metal or plastic part in the lateral direction perpendicular to the direction of double arrow 26. Sheet metal tongue 22 can also have a bent section that can be clamped within guide channel 25a. It is also possible in addition to provide a catch between sheet metal tongue 22 and a metal or plastic part of clamping device 25 within guide channel 25a.

In so doing, for example, a plastic part of the catch mechanism can be fixedly connected to circuit board 13 or to parts of the clamping device.

In regard to the passing of sheet metal tongue 22 through the opening in circuit board 13, a ground conductor provided there in the form of a trace can also be contacted with sheet metal tongue 22 in the plane of circuit board 13. On the one hand, a trace of the circuit board can be connected in this way to the ground element via sheet metal tongue 22, but it can also be provided that the ground element is connected in a different way over a short path to the trace of the circuit board and sheet metal tongue 22 is connected to the ground element solely via the trace of circuit board 13. In this case, sheet metal tongue 22 is used for creating a conductive connection between the trace at ground potential of circuit board 13 and shield plate 17.

If clamping device 25 is fixedly connected to circuit board 13, contact tab 27 can also be realized by a flexible conductor.

Opening 23 in the circuit board, through which sheet metal tongue 22 extends, can also be located, for example, on the edge of circuit board 13 and be open toward the edge, therefore represent only a lateral recess of circuit board 13.

Figure 3:
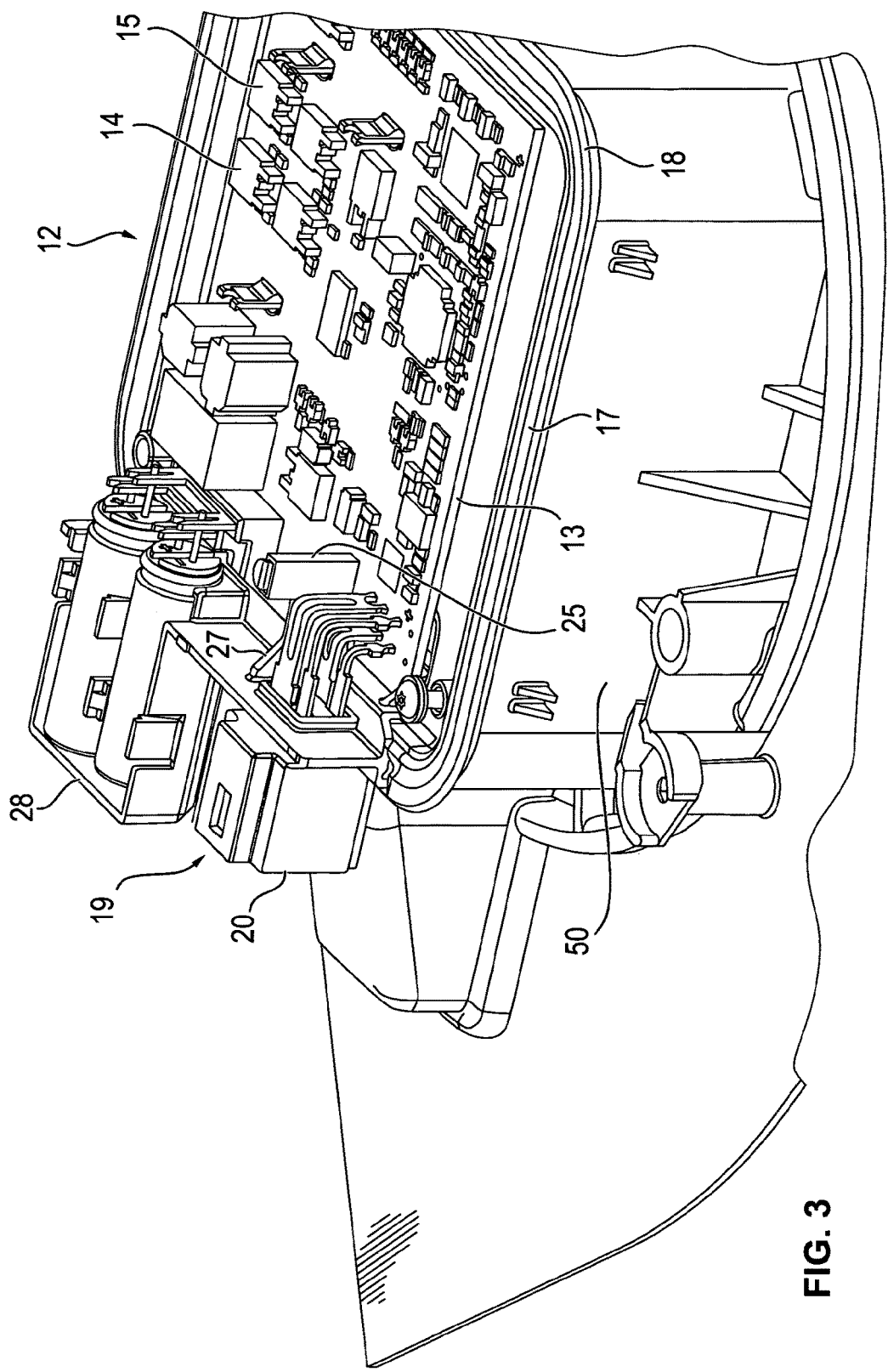
FIG. 3 shows a three-dimensional view of a control device and a motor housing.

FIG. 3 in a three-dimensional view shows an electric motor with a housing 50 and a control device 12 with a circuit board 13 and a shield plate 17, located below circuit board 13 in the figure, with a flanged edge 18. Shield plate 17 can be in close contact, for example, with circuit board 13, so that shield plate 17 can serve simultaneously as a heat sink for the electronic components of circuit board 13. Thermal bridges can be provided between circuit board 13 and shield plate 17 and the two elements can also be glued directly to one another.

Shield plate 17 is connected to housing 50 in a manner not shown further. Various electronic components 14, 15 can be seen in the figure on the top side of circuit board 13; these include, for example, thyristors, IGBTs, or similar semiconductor components, which make it possible to control the motor winding via pulse width modulated signals at a high frequency.

A connector 19 with a coupling element 20 in the form of a part of a plug connection can also be seen in FIG. 3, whereby coupling element 20 is made as a plug housing with contact pins in its interior. Plug housing 20 is connected, for example, directly to the ground potential or it contains a contact pin, which for its part is connected to the ground potential.

A contact tab 27 is shown on the populated side of circuit board 13 of connector 19 in FIG. 3; the tab is made as a welded metal sheet, for example, fixedly connected to a frame 28 of connector 19. Frame 28 of the connector in this case can form a ground element.

Moreover, clamping device 25 from which a sheet metal tongue projects at the top can be seen in FIG. 3.

Figure 4:
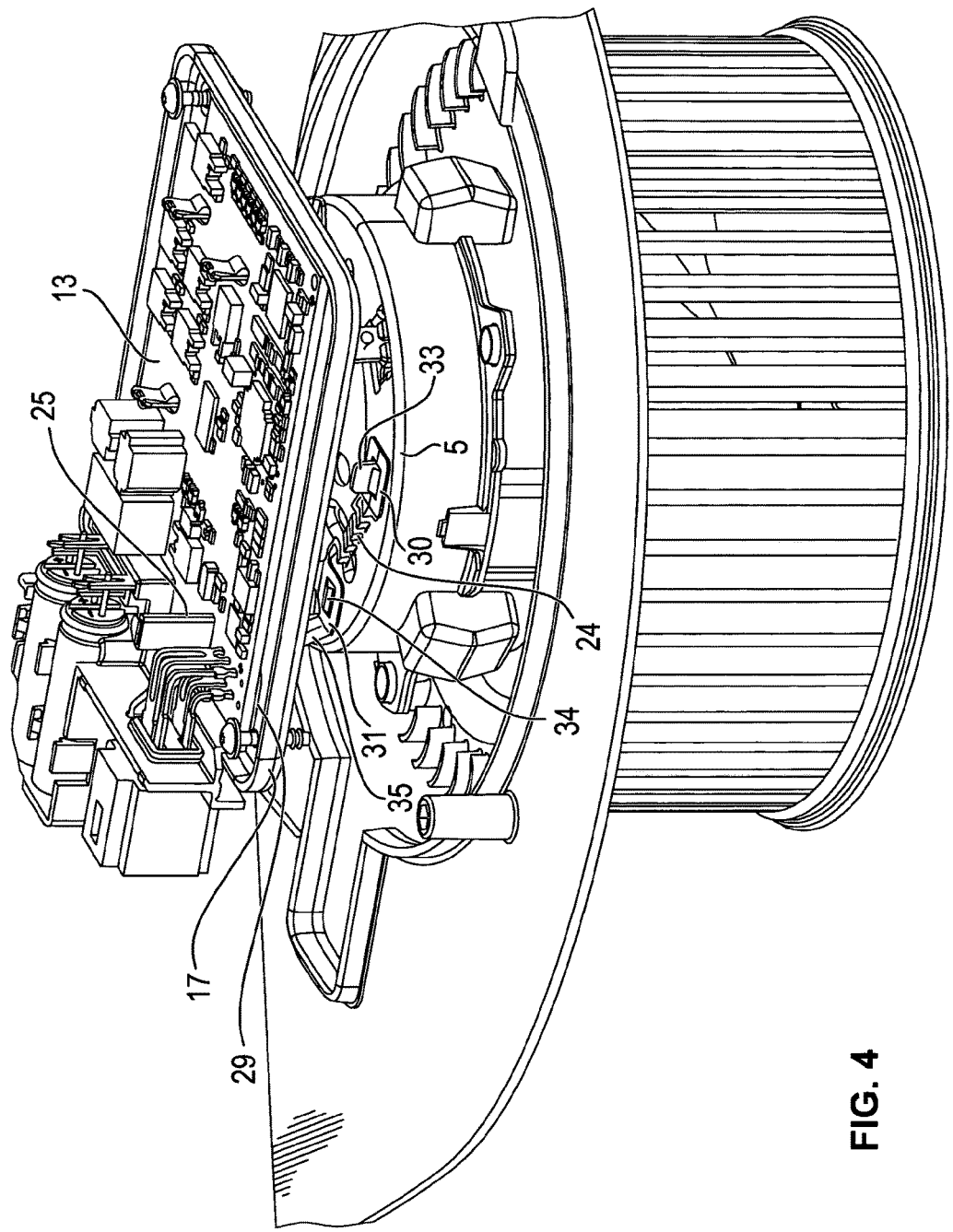
FIG. 4 shows a three-dimensional view of a control device with an electric motor, the housing being partially omitted.

FIG. 4 shows the structure of FIG. 3 from a somewhat different viewing angle, whereby it should be pointed out that shield plate 17 has a depression 29 in the area of the recess in circuit board 13, through which the sheet metal tongue projects in the area of clamping device 25, so that the distance between shield plate 17 and circuit board 13 is increased and room for a pressure contact device or for a pressure contact part 22a of sheet metal tongue 22 is formed in this area.

The depression is shown in a cut in FIG. 1 by a broken line in the area of the sheet metal tongue below shield plate 17.

The connection of the shield plate to an end shield 5 of the motor in the form of contact bridge 24 is also shown in FIG. 4 below shield plate 17.

The contact bridge has a first securing section 30 and a second securing section 31 and a bridge element 32 between them. This will be explained in detail below.

Securing sections 30, 31 of contact bridge 24 are mounted on contact pins 33, 34, which are used either only for the securing or for the securing and electrical contacting of the contact bridge. It can be seen, in addition, in FIG. 4 that contact bridge 24 on the side, facing away from first securing section 30, of second securing section 31 has a resilient contact arm 35, which is oriented in the direction toward the bottom side of shield plate 17 and contacts it.

Figure 5:
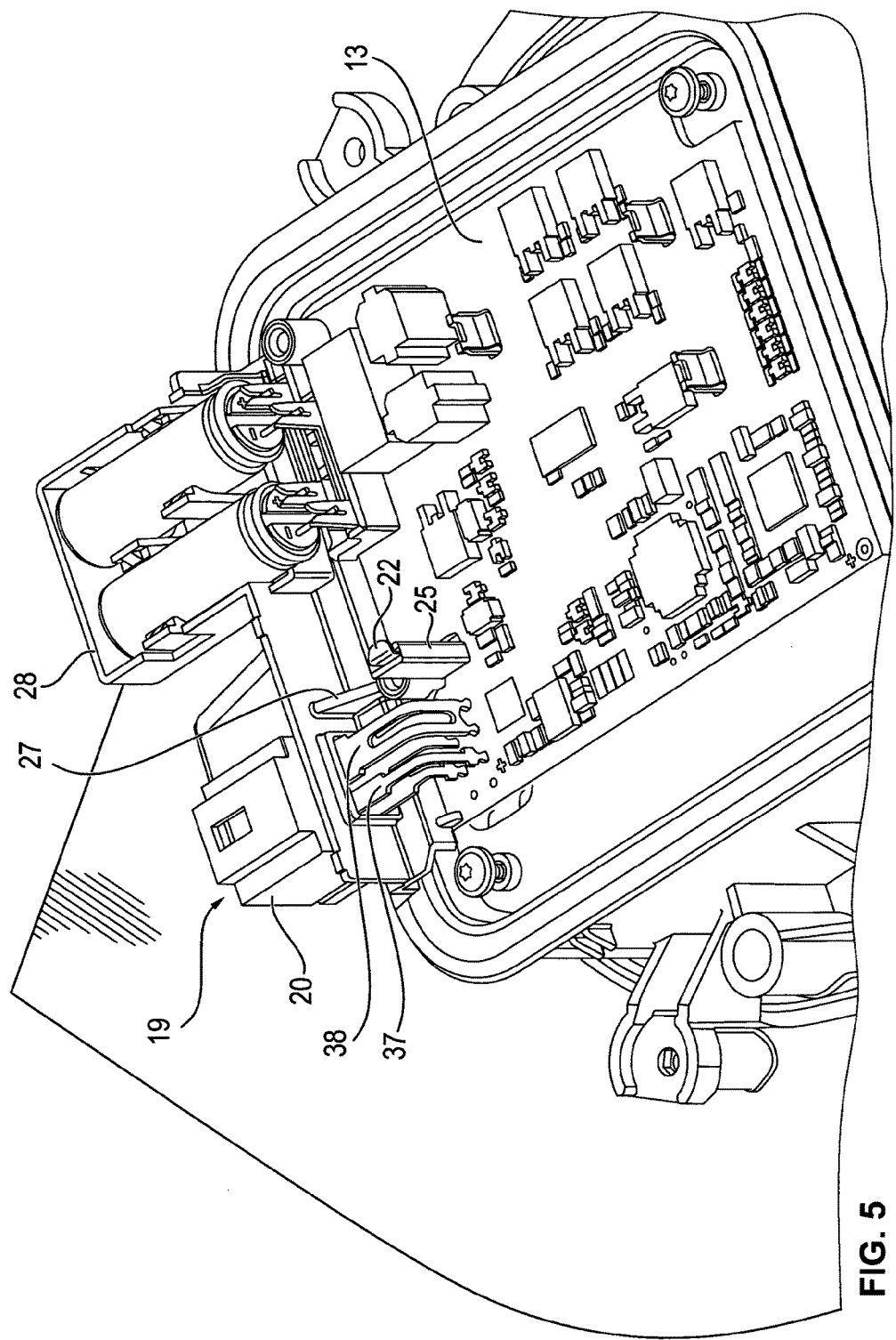
FIG. 5 shows a view of a control device for an electric motor seen from the component side of the circuit board.

FIG. 5 in a further three-dimensional view shows the top side of the electric motor already shown in FIGS. 3 and 4, whereby clamping device 25 with sheet metal tongue 22 and contact tab 27 can be seen especially well. A hollow cylindrical metallic contact element 36, connecting contact tab 27 to clamping device 25, is inserted between contact tab 27 and clamping device 25. It can be seen, moreover, that the contact pins of coupling element 20 on the side of circuit board 13 are connected via connecting conductors 37, 38 in each case to traces of circuit board 13. However, in this embodiment no connecting conductor, at ground potential, of connector 19 is connected directly to a trace of circuit board 13, so that the parts, to be connected to the ground potential, of the control device are connected solely via contact tab 27 or sheet metal tongue 22 to ground element/frame 28.

FIGS. 6 to 9, which will be explained subsequently, show different views of different, easily variable clamping devices that can be used within the scope of the invention.

Figure 6:
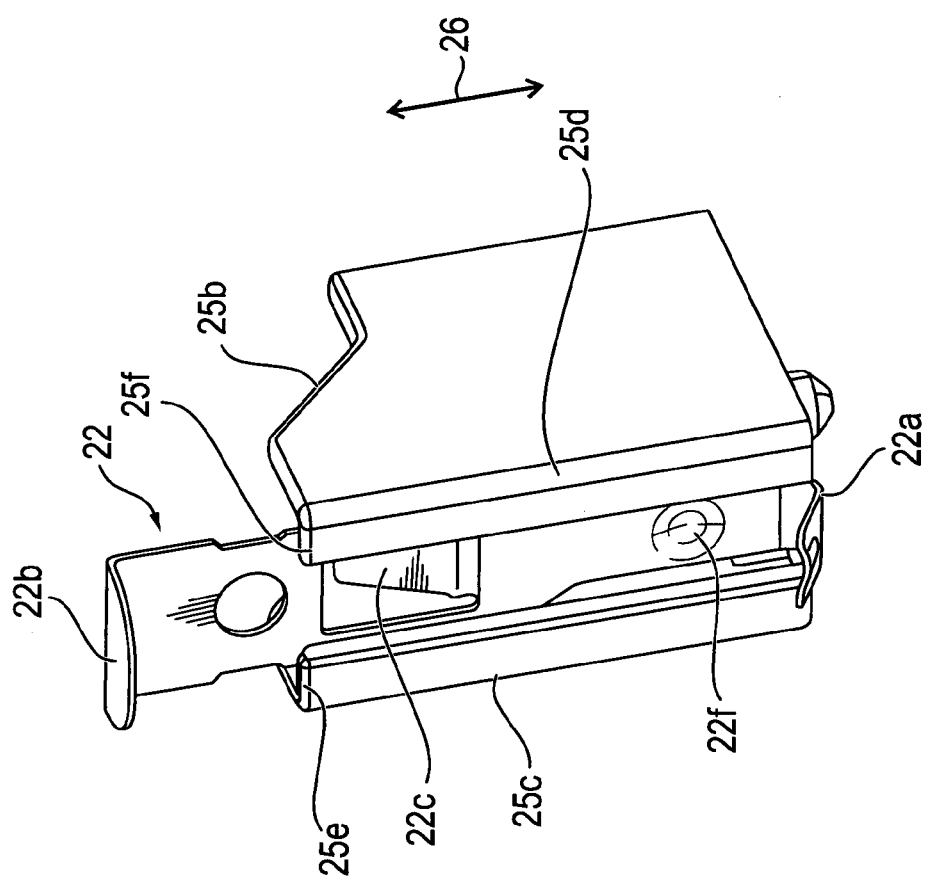
FIG. 6 shows a sheet metal tongue with a guide rail in a three-dimensional illustration.

FIG. 6 in this regard shows a guide rail 25b which has two side walls 25c and 25d, between which sheet metal tongue 22 can be moved in the direction of double arrow 26. Side walls 25c, 25d each have end brackets 25e, 25f, which partially cover the face side of sheet metal tongue 22 and form a guide surface for sheet metal tongue 22.

Sheet metal tongue 22 at its top end has a flat section 22b, which is made here as a sheet metal tongue end that is bent at a right angle and can be used, for example, for manipulating sheet metal tongue 22, i.e., specifically the sliding in clamping device 25.

Pressure contact part 22a in the form of a likewise bent end with an embossed indentation 22f can be seen at the bottom end of sheet metal tongue 22, the end being opposite to the flat section.

In its profile, the sheet metal tongue has a detent lug 22c, which is formed as punched-out sheet metal tongue part, which in the illustration in FIG. 6 is bent into the plane of the drawing. During the insertion of sheet metal tongue 22 into clamping device 25, the detent lug 22*c*, which can be a punched-out sheet metal catch, can engage behind a protrusion of a part of clamping device 25, as a result of which sheet metal tongue 22 is kept from sliding out of clamping device 25. This is explained in greater detail below in connection with FIG. 8.

Figure 7:
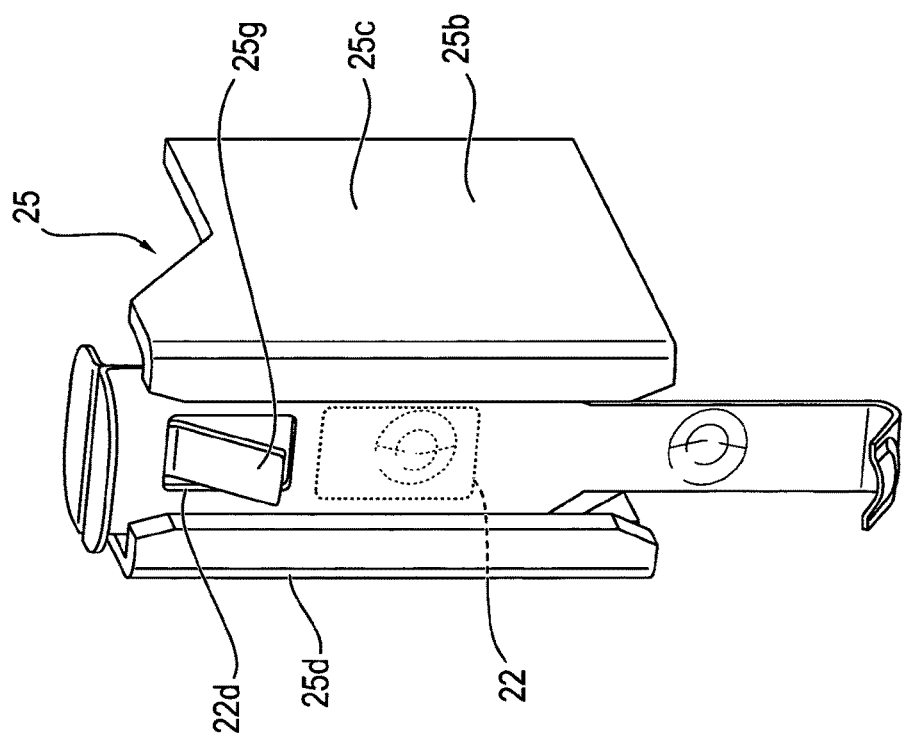
FIG. 7 shows further illustrations of a sheet metal tongue according to FIG. 6 from other view directions.

FIG. 7 shows an arrangement in which sheet metal tongue 22 has a detent opening 22*d*, which during the insertion of the sheet metal tongue in clamping device 25 engages with a projecting lug 25*g* of the clamping device for locking.

Lug 25*g* can be, for example, a part of a structural element which is not visible in FIG. 7 and which is fixed between the two walls 25*c*, 25*d* and can consist, for example, of metal or plastic.

Figure 8:
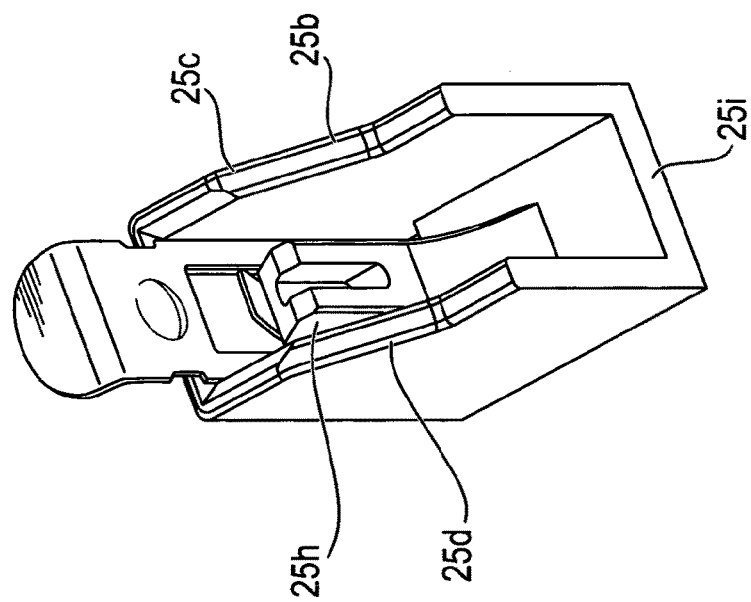
FIG. 8 shows further illustrations of a sheet metal tongue according to FIG. 6 from other view directions.

FIG. 8 shows from the open side of clamping device 25*b* the space between side walls 25*c* and 25*d* where structural element 25*h* is located, which has a detent lug and can consist of metal or plastic. Structural element 25*h* can be attached, for example, to bottom 25*i* of clamping device 25, the bottom running between side walls 25*c* and 25*d*. A punched-out sheet metal tab part of the sheet metal tongue is shown which can engage with the detent lug.

Figure 9:
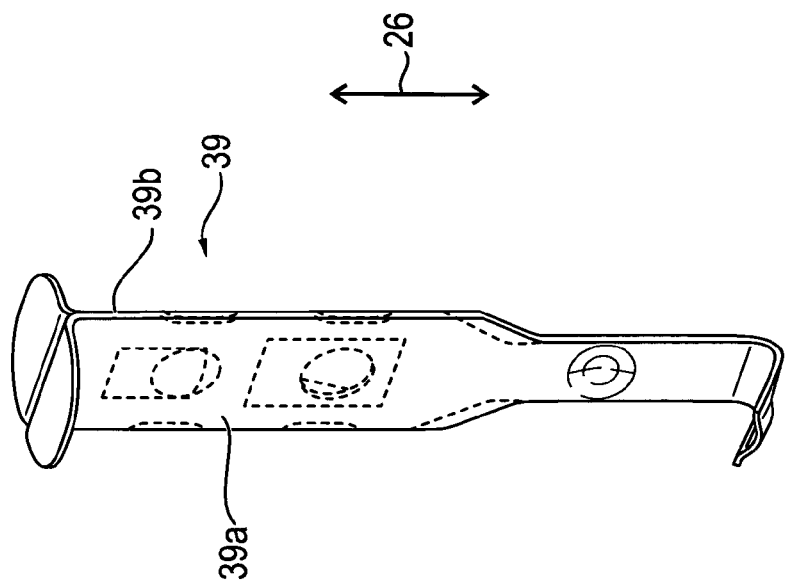
FIG. 9 shows a sheet metal tongue as illustrated in FIGS. 6 to 8, without a guide rail.

FIG. 9 shows a sheet metal tongue 39, which has a front metal strip 39*a* and a partially congruent back metal strip 39*b*, which are adjacent to one another and can be moved against one another in their longitudinal direction (double arrow 26). By moving the metal strips against one another, for example, a metal catch on one of the metal strips, acting as a detent lug, can be deformed to unlock a detent lug of the clamping device. For this purpose, for example, back metal strip 39*b* has an opening, through which a metal catch of the front metal strip can penetrate for engaging with a detent lug. By the movement of the back metal strip in relation to the front metal strip, the opening in the back metal strip can be moved and bent back in relation to the metal catch of the front metal strip.

Figure 10:
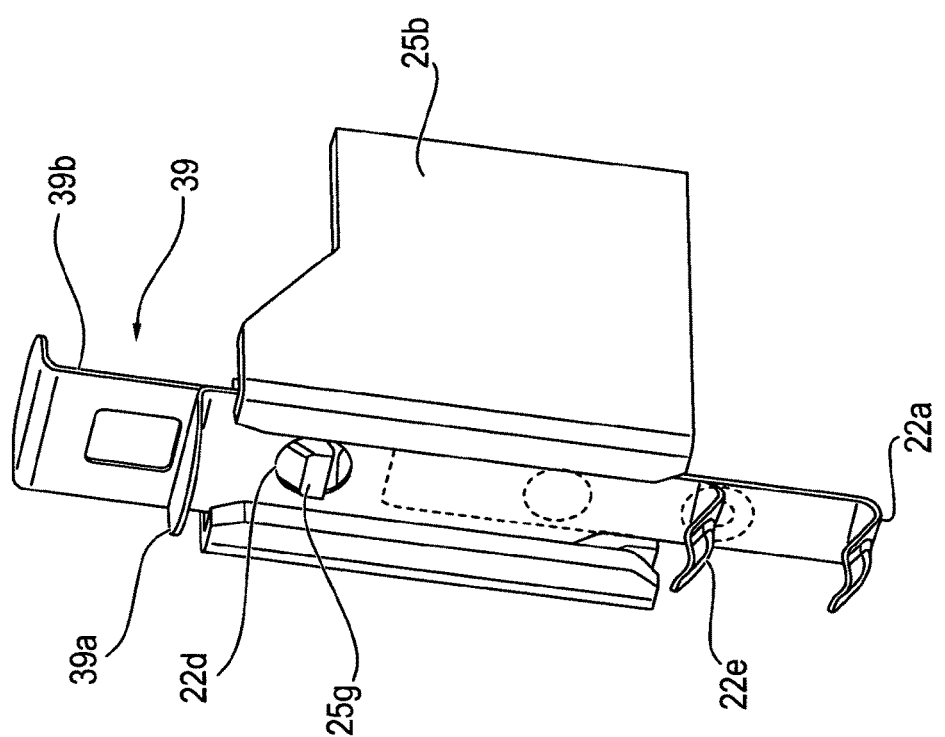
FIG. 10 shows a further embodiment of a sheet metal tongue with a guide rail.

FIG. 10 shows a clamping device 25 with a guide rail 25*b* and a sheet metal tongue 39, which is constructed as described with use of FIG. 9. The front and back metal strips 39*a*, 39*b* are moved relative to one another such that an engaging with detent lug 25*g* of the clamping device can occur. It projects through an opening 22*d* in the sheet metal tongue.

It is shown, moreover, that a pressure contact part 22*a* projects downward through the opening (not shown) in the circuit board and to the shield plate. A second pressure contact part 22*e* is shown which is used for contacting of sheet metal tongue 39 with circuit board 13 or a trace provided there via an indentation provided on contact part 22*e*. The two pressure contact parts 22*a*, 22*e* can be provided on each of the different metal strips/parts 39*a*/39*b* of sheet metal tongue 39 or together on the same metal strips/parts.

The engaging of lug 25*g* in detent opening 22*d* can be undone by moving part 39*b* of sheet metal tongue 39 in relation to part 39*a*.

Figure 11:
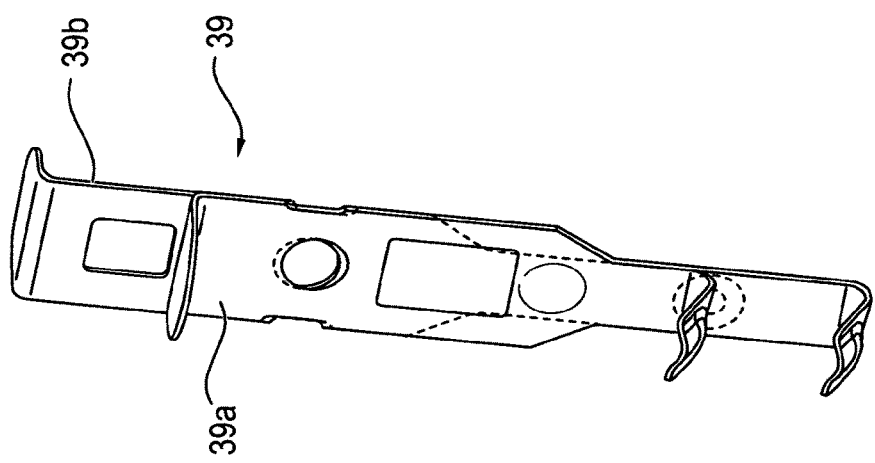
FIG. 11 shows a sheet metal tongue as illustrated in FIG. 10, without a guide rail.
Figure 12:
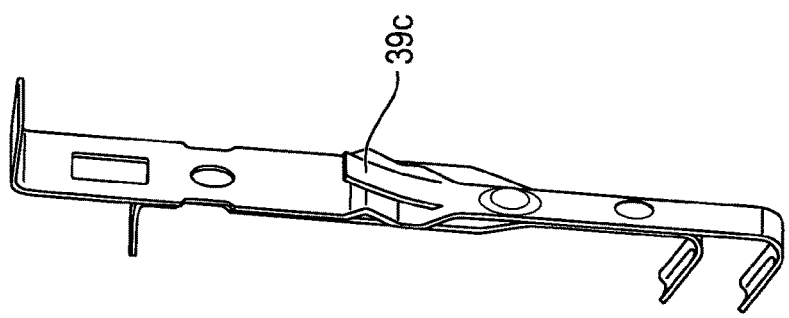
FIG. 12 shows a sheet metal tongue as illustrated in FIG. 11, in a different view.

FIG. 11 shows sheet metal tongue 39 with front metal strip 39*a* and back metal strip 39*b* with a full view from a first side, whereas FIG. 12 shows the same configuration from FIG. 11 from the opposite side with detent lug 39*c*.

Figure 13:
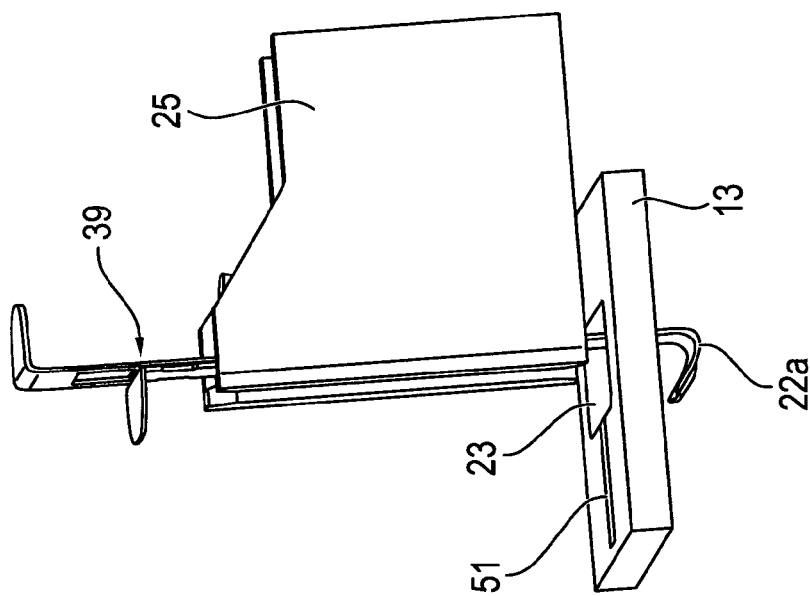
FIG. 13 shows a sheet metal tongue in a guide rail as illustrated in FIG. 10, in a different view.

FIG. 13 shows clamping device 25 with sheet metal tongue 39 which projects through opening 23 in circuit board 13 and pressure contact part 22*a* to be contacted with shield plate 17 below circuit board 13.

Figure 14:
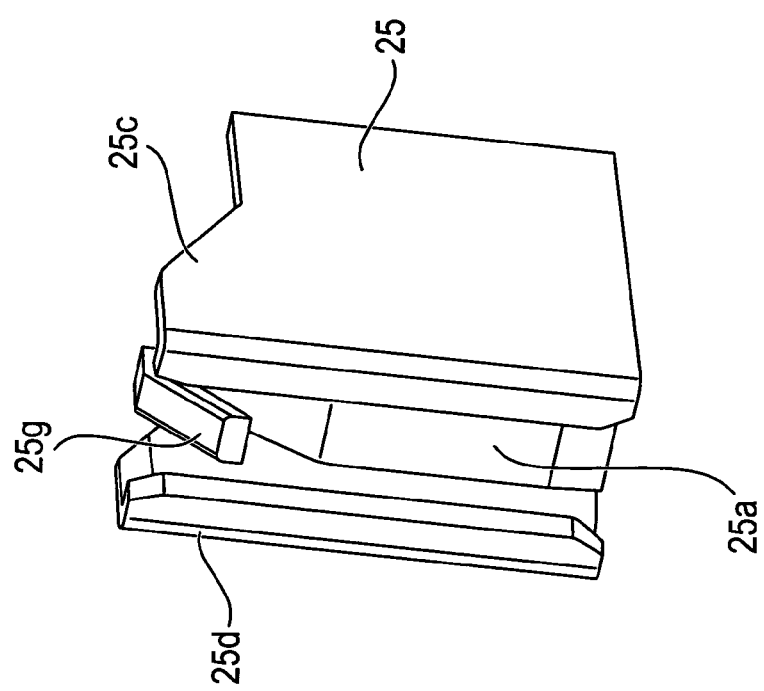
FIG. 14 shows a guide rail for a sheet metal tongue according to FIGS. 10 to 13.

Clamping device 25 is shown in FIG. 14 with both side walls 25*c*, 25*d* and a structural element 25*h* provided between these and bearing lug 25*g*. Lug 25*g* can be elastically deformable, for example, and be removable by a compressive force from the motion path of the sheet metal tongue in clamping device 25.

Figure 15:
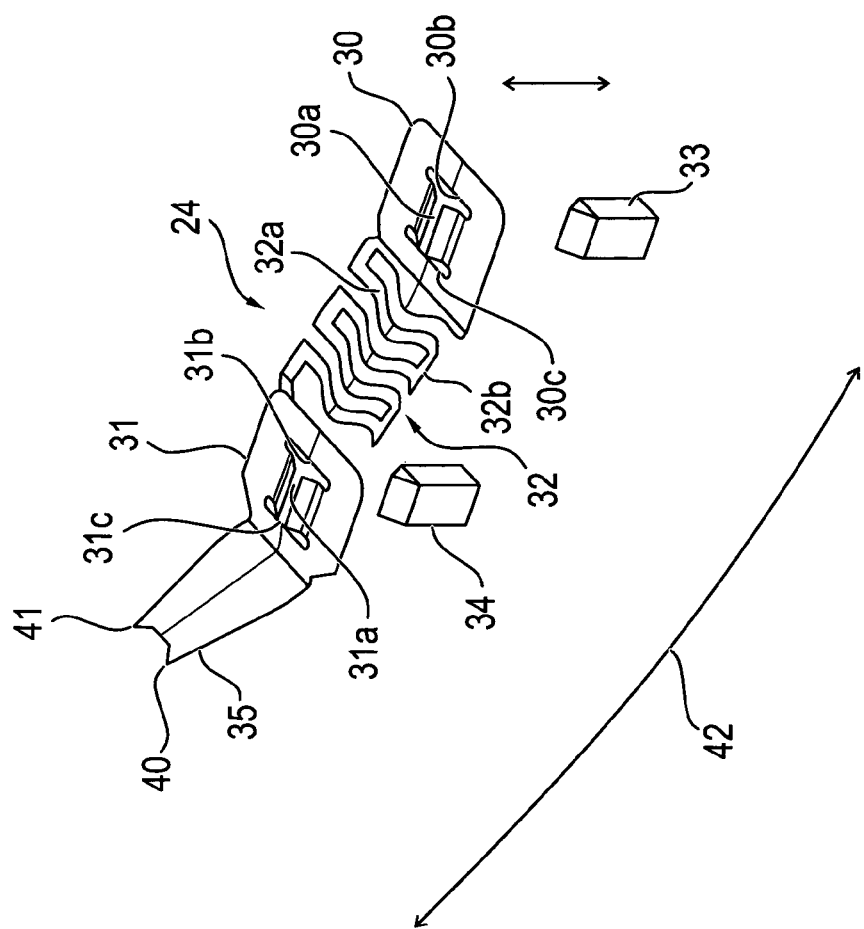
FIG. 15 shows a bridge element for connecting a stator of an electric machine to a ground element.

FIG. 15 in a three-dimensional view shows a contact bridge 24 with a first securing section 30 and a second securing section 31 and a bridge element 32 located between them. Both securing sections 30, 31 as well as bridge element 32 and a contact arm 35 adjacent to securing section 31 are advantageously made as a single piece from a single spring sheet, for example, by stamping or laser cutting of a flat spring sheet.

Securing sections 30, 31 are each made as extensive planar sections and in each case have a continuous clamping opening 30*a*, 31*a*, formed as a straight clamping slot in the exemplary embodiment. Separation slots 30*b*, 30*c* and 31*b*, 31*c*, each of which runs transverse, particularly perpendicular to clamping slots 30*a*, 31 *a*, are located at both ends of clamping slots 30*a*, 31 *a*. Edge strips in securing sections 30, 31, which run parallel next to the particular clamping slots and can be bent out of the plane of the securing sections, are formed by separation slots 30*b*, 30*c*, 31 *b*, 31*c*.

Contact bridge 24 can be placed on clamping pins 33, 34 such that they penetrate clamping slots 30*a*, 31 *a* with the upward bending of the edge regions and are clamped there. With the special design of the edge regions, these are actively interlocked in clamping pins 33, 34, which results in an especially high stability against the pulling of contact bridge 24 off the clamping pins.

Bridge element 32, which is formed substantially as a meander-shaped planar metal conductor, is provided between securing sections 30, 31 in order to make the bridge element as flexible as possible to movements of securing sections 30, 31 in all directions.

The individual conductor sections 32*a*, 32*b* of the meander-shaped conductor arrangement are made intrinsically bent in order to achieve as great a flexibility as possible.

A contact arm 35, which at its free end has contact tips 40, 41, which in the contacting state are pressed elastically against the bottom side of shield plate 17, adjoins as a single piece second securing section 31. After assembly, contact arm 35 creates a resilient, electrically conductive connection of contact bridge 24 to shield plate 17 and thereby also a contact between the shield plate and, for example, an end shield of the electric motor, the shield to which clamping pin 33 is attached.

Other contacting securing types for the contact bridge are also conceivable instead of clamping pins 33, 34 such as, for example, securing via a screw. The securing via clamping pins onto which the securing sections can be pushed is especially easy in terms of assembly, however.

It is evident from FIG. 15 that clamping pins 33, 34 taper at their free ends in order to facilitate the insertion in clamping slots 30*a*, 31 *a*.

The design of contact bridge 24 produces a secure connection between the element to which first securing section 30 is connected and the element to which the second securing section 31 is connected or the element onto which resilient contact arm 25 is pressed, regardless of whether these elements, for example, vibrate during operation of the motor. In this way, for example, a ground connection of a ground element, for example, as an element of a connector, to an end shield can be reliably created.

Figure 16:
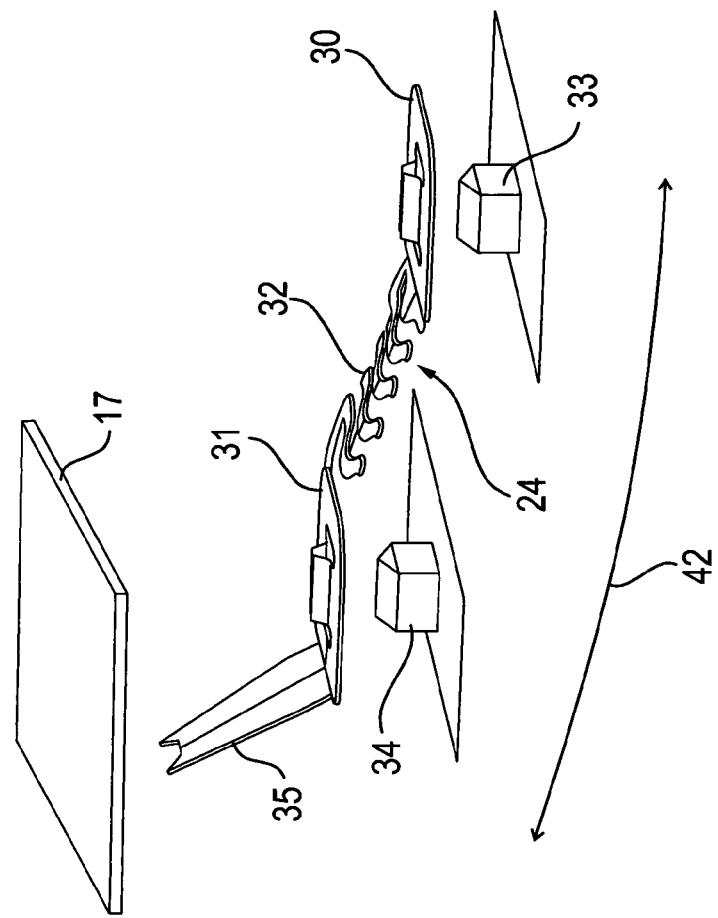
FIG. 16 shows the bridge element from FIG. 15 in a different view.

FIG. 16 shows contact bridge 24 from FIG. 15 in a somewhat perspectively changed view, whereby it becomes clear that contact bridge 24 can be bent easily out of the sheet metal plane but runs substantially in a longitudinal direction, which is indicated by double arrow 42. Double arrow 42 is also indicated in FIG. 15. Securing sections 30, 31 are slightly angled relative to bridge element 32. Clamping pins 33, 34 are shown in addition.

Figure 17:
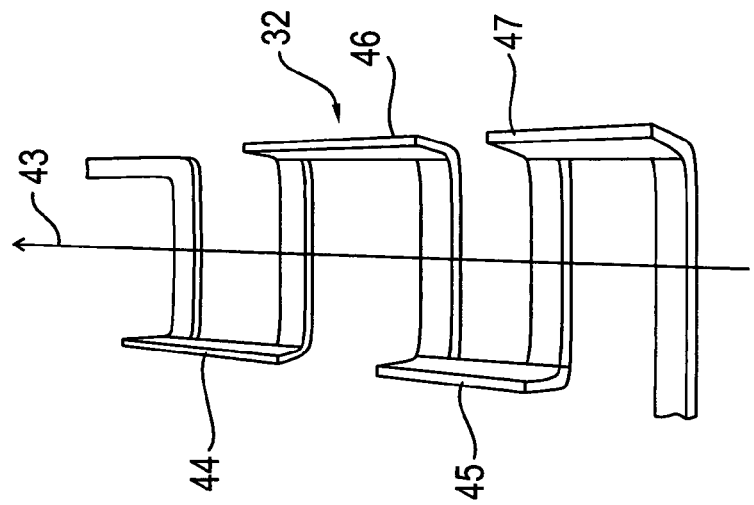
FIG. 17 shows an illustration of a meander-shaped spring sheet in a three-dimensional view.

FIG. 17 in a perspective view shows bridge element 32 with a plurality of meander-shaped conductor windings with a course direction 43 of bridge element 32 or contact bridge 24. It is indicated in this case that the lateral conductor sections 44, 45, 46, 47 of the meander-shaped conductor arrangement, the sections being oriented substantially in course direction 43 of the bridge element, are bent out of the plane of the other conductor sections, therefore the metal sheet plane and securing sections 30, 31, in a perpendicular manner such that these conductor sections 44, 45, 46, 47 run parallel to the course direction 43 and perpendicular to the sheet metal plane. In the exemplary embodiment, the bending edges of the aforementioned bent-out conductor sections are parallel to course direction 43 of bridge element 32.

As a result, in this area of the aforementioned bent-out conductor sections 44, 45, 46, 47, a sideways curving of bridge element 32 within the plane of the spring sheet, which coincides with the plane of the rest of the conductor sections of bridge element 32, is made easier. Overall, therefore the flexibility of bridge element 32 becomes greater when these perpendicularly bent, wall-like conductor sections 44, 45, 46, 47 are provided.

A reliable and low-impedance connection of stator and rotor parts to be brought to ground potential and of the end shield of an electric motor to a ground element or ground connection is therefore improved overall by the described measures and features of the invention, so that overall the electromagnetic shielding of the windings, to which signals are applied, of the electric machine is improved and the stability against voltage flashovers is also improved by a ground connection with a lower resistance and lower impedance.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A rotary electric machine comprising:
    a stator;
    a rotor;
    an electrical control device;
    a connector, which has at least one coupling element for electrically connecting the control device to one or more electrical lines; and
    a ground element connected to an electrical ground potential,
    wherein the stator is connected to the ground element via a contact bridge that comprises a first securing section, a second securing section, a bridge element arranged between the first securing section and second securing section, the bridge element being a single-piece spring sheet formed at least partially meander-shaped,
    wherein the first and/or second securing section have a continuous clamping opening,
    wherein a clamping pin is adapted to be clamped in the continuous clamping opening, and
    wherein at least one of the first or second securing section has at least one separation slot open toward the continuous clamping opening such that at least one edge region of the continuous clamping opening is adapted to be bent out perpendicular to a plane of the a least one of the first or second securing section due to the at least one separation slot.

2. The rotary electric machine according to claim 1, wherein the spring sheet has a plurality of adjoining curved sections with a changing curvature direction.

3. The rotary electric machine according to claim 1, wherein the bridge element is made up of adjoining S-shaped elements and/or mirrored S-shaped elements.

4. The rotary electric machine according to claim 1, wherein the bridge element extends substantially as a planar spring sheet in a first surface along a longitudinal direction, which is defined by a connection line between the first and second securing section, and wherein sections of the spring sheet, which run substantially in the longitudinal direction or parallel to the longitudinal direction, are angled by 90° out of the first surface relative to other sections of the spring sheet.

5. The rotary electric machine according to claim 1, wherein the continuous clamping opening is a straight clamping slot, wherein at both ends of the clamping slot, in each case, at least one separation slot connected to the clamping slot is provided, and wherein, in each case, a bendable edge strip is formed between the separation slots.

6. The rotary electric machine according to claim 1, wherein the contact bridge has a resilient contact arm to form an electrical pressure contact with a counter contact and wherein the counter contact is a metal plate placed between a printed circuit board of the control device and the stator.

7. The rotary electric machine according to claim 6, wherein the resilient arm abuts directly against the metal plate.

8. The rotary electric machine according to claim 1, wherein the stator and the rotor are at least partially at ground potential.

9. The rotary electric machine according to claim 1, wherein the rotary electric machine is brushless.

10. The rotary electric machine according to claim 1, wherein the rotary electric machine is an electric motor.

* * * * *

UNITED STATES PATENT AND TRADEMARK OFFICE
CERTIFICATE OF CORRECTION

PATENT NO. : 10,298,088 B2
APPLICATION NO. : 14/809700
DATED : May 21, 2019
INVENTOR(S) : Berkouk et al.

Page 1 of 1

It is certified that error appears in the above-identified patent and that said Letters Patent is hereby corrected as shown below:

On the Title Page

Item (30), delete:
"(30) Foreign Application Priority Data
Jan. 24, 2014    (DE)            10 2013 001 314"

And insert:
--(30) Foreign Application Priority Data
Jan 26, 2013    (DE)            10 2013 001 314--

Signed and Sealed this
Twentieth Day of August, 2019

Andrei Iancu
*Director of the United States Patent and Trademark Office*